United States Patent [19]

Murayama

[11] Patent Number: 4,996,594
[45] Date of Patent: Feb. 26, 1991

[54] DYNAMIC IMAGE TRANSMISSION SYSTEM

[75] Inventor: Noboru Murayama, Machida, Japan

[73] Assignee: Ricoh Company, Ltd., Japan

[21] Appl. No.: 376,862

[22] Filed: Jul. 7, 1989

[30] Foreign Application Priority Data

Jul. 8, 1988 [JP] Japan .................. 63-168960

[51] Int. Cl.⁵ .............................. H04N 7/12
[52] U.S. Cl. ..................... 358/136; 358/85; 358/105; 379/53
[58] Field of Search ............... 358/85, 133, 135, 136, 358/105; 379/53

[56] References Cited

U.S. PATENT DOCUMENTS

| 4,494,144 | 1/1985 | Brown | 358/85 |
| 4,703,348 | 10/1987 | Yuasa | 358/135 |
| 4,774,574 | 9/1988 | Daly | 358/133 |
| 4,827,339 | 5/1989 | Wada | 358/136 |

FOREIGN PATENT DOCUMENTS

144914 2/1977 Japan.

Primary Examiner—Howard W. Britton
Attorney, Agent, or Firm—Mason, Fenwick & Lawrence

[57] ABSTRACT

A dynamic image transmission system comprises an input part for inputting image data of an input image, a memory for storing the image data successively input from the input part and for storing transmitting image data which is to be transmitted, an extracting part for extracting a dynamic region which is a portion of the input image and contains a movement by comparing image data of the successive frames stored in the memory, a transmission part for transmitting the image data stored in the memory to a transmission path as the transmitting image data, and a control part for controlling operations of the extracting part and the transmission part during an image transmission mode. The image data related to a first frame of the input image is transmitted as the transmitting image data but only the image data within the extracted dynamic region is transmitted as the transmitting image data with respect to second and subsequent frames.

20 Claims, 6 Drawing Sheets

FIG. 6 ies per unit time. A large number of still images must be transmitted per unit time in order to smoothly describe a dynamic image which includes a quick movement, and in this case, a wide frequency band is required to transmit the image data. Hence, as a system of efficiently transmitting the dynamic image, there conventionally is a so-called interlace scanning system which roughly scans one image a plurality of times and increases an apparent repetition frequency without increasing the transmission band width. The NTSC system employed in television broadcasting and video equipments is well known as an example of the interlace scanning system.

DYNAMIC IMAGE TRANSMISSION SYSTEM

BACKGROUND OF THE INVENTION

The present invention generally relates to dynamic image transmission systems, and more particularly to a dynamic image transmission system which transmits a dynamic image (motion picture or moving picture) with a limited line speed by greatly reducing the transmitting information quantity and is suited for application to a video phone which uses an analog line.

When describing a dynamic image, it is necessary to transmit several still images per unit time. A large number of still images must be transmitted per unit time in order to smoothly describe a dynamic image which includes a quick movement, and in this case, a wide frequency band is required to transmit the image data. Hence, as a system of efficiently transmitting the dynamic image, there conventionally is a so-called interlace scanning system which roughly scans one image a plurality of times and increases an apparent repetition frequency without increasing the transmission band width. The NTSC system employed in television broadcasting and video equipments is well known as an example of the interlace scanning system.

When a change in the object image is relatively gradual, a narrow band television system proposed in a Japanese Laid-Open Patent Application No. 52-144914 samples the image along a scanning line by a flying spot to obtain the image data. The image data is transmitted to a receiver side which successively corrects parts of the image data so as to obtain a reproduced image which follows the gradual change in the object image.

The NTSC system is a dynamic image transmission system which has a large band compression effect but is unsuited to a transmission path which has a low data transmission rate such as a telephone line.

On the other hand, the proposed narrow band television system has a large band compression effect but has a low data compression effect because the entire picked up image is constantly transmitted at a long time rate. For this reason, the proposed narrow band television system cannot be used when the movement in the object image is quick.

According to the conventional systems, the entire picked up image is constantly transmitted repeatedly in conformance with a predetermined procedure regardless of whether the interlace scanning or the non-interlace scanning is employed. As a result, the receiver side must count the number of data with reference to a synchronizing signal for the purpose of identifying the corresponding positional relationships of the received data. In addition, unnecessary data are included in the transmitted data because the data of the entire image are transmitted regardless of whether or not the image changes, that is, a movement occurs in the image. For this reason, the data compression efficiency is poor and is unsuited for the transmission of the image which includes a quick movement.

SUMMARY OF THE INVENTION

Accordingly, it is a general object of the present invention to provide a novel and useful dynamic image transmission system in which the problems described above are eliminated.

Another and more specific object of the present invention is to provide a dynamic image transmission system comprising input means for inputting image data of an input image, memory means for storing the image data successively input from the input means and for storing transmitting image data which is to be transmitted, extracting means for extracting a dynamic region which is a portion of the input image and contains a change in image data from that of a previous frame by comparing image data of two successive frames stored in the memory means, transmission means for transmitting the image data stored in the memory means to a transmission path as the transmitting image data, and control means for controlling operations of the extracting means and the transmission means during an image transmission mode so that image data related to a first frame of the input image is transmitted as the transmitting image data but only the image data within the extracted dynamic region is transmitted as the transmitting image data with respect to second and subsequent frames. According to the dynamic image transmission system of the present invention, it is possible to considerably reduce the quantity of the image data which is to be transmitted even when the image to be transmitted is dynamic, that is, the image includes a movement. For this reason, it is possible to transmit a dynamic image which includes a quick movement in a transmission path which has a low data transmission rate such as a telephone line.

Other objects and further features of the present invention will be apparent from the following detailed description when read in conjunction with the accompanying drawings.

DESCRIPTION OF THE PREFERRED EMBODIMENTS

Figure 1:
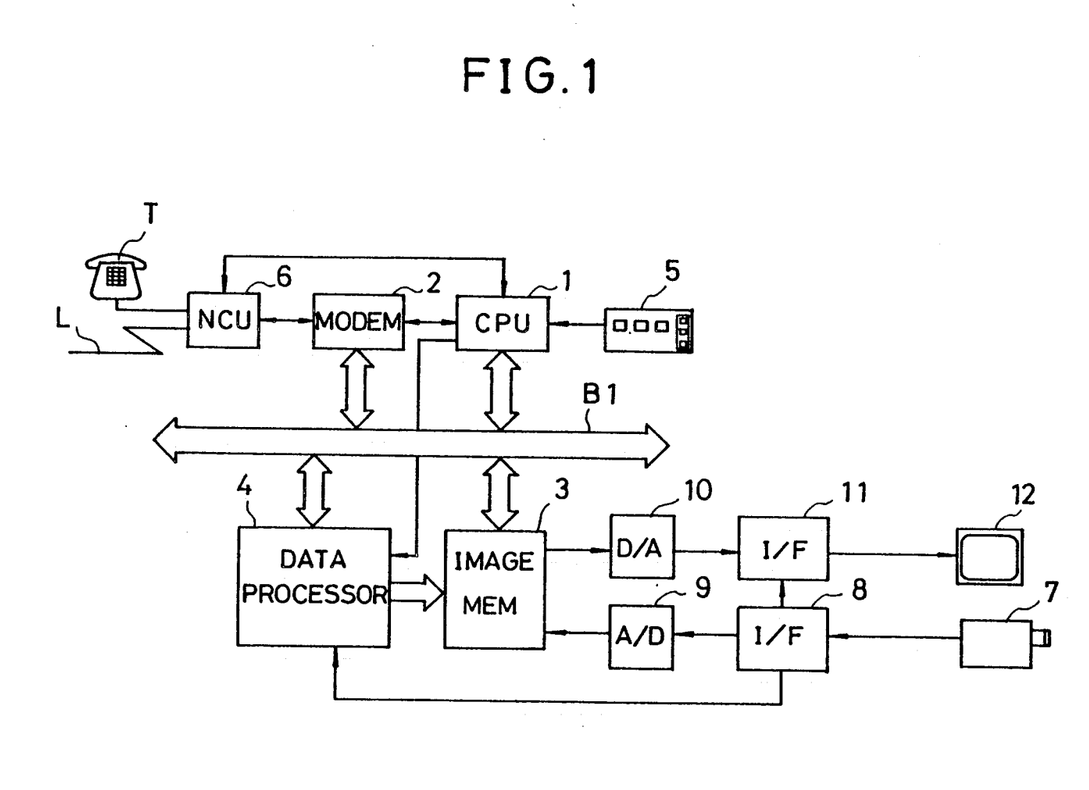
FIG. 1 is a system block diagram showing an embodiment of a dynamic image transmission system according to the present invention.

FIG. 1 shows an embodiment of a dynamic image transmission system according to the present invention. In this embodiment, the dynamic image transmission system is applied to a video phone.

In FIG. 1, a central processing unit (CPU) 1, a modem 2, an image memory 3, and a data processor 4 are connected to a main bus B1. The CPU 1 is controlled in response to commands entered from a keyboard 5. The modem 2 is coupled to a telephone set T and a telephone line L via a network control unit (NCU) 6. The image memory 3 is supplied with and stores a video signal output from a camera 7 via a camera interface 8 and an analog-to-digital (A/D) converter 9. On the other hand, the stored image data in the image memory 3 is supplied and displayed on a display 12 via a digital-to-analog (D/A) converter 10 and a television interface 11.

Figure 2:
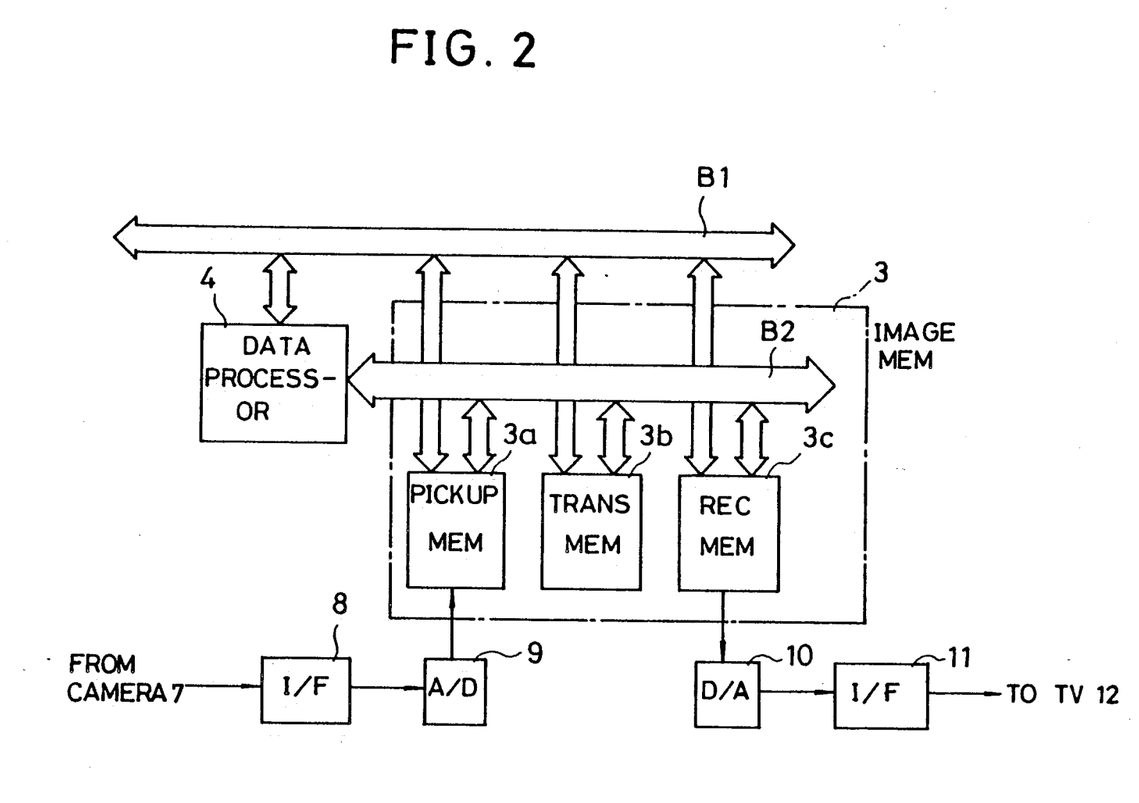
FIG. 2 is a system block diagram showing an embodiment of an image memory shown in FIG. 1 together with related parts.

FIG. 2 shows an embodiment of the image memory 3 shown in FIG. 1 together with related parts. The image memory 3 has a pickup memory 3a, a transmission memory 3b, and a reception memory 3c which are connected to both the main bus B1 and an image bus B2. The pickup memory 3a, the transmission memory 3b, and the reception memory 3c are coupled to the data processor 4 via the image bus B2. The pickup memory 3a receives image data from the A/D converter 9, and the reception memory 3c supplies image data to the D/A converter 10. Since the read out operation of the image memory 3 is carried out with a timing independent of the data renewal, a dual port memory is used for the image memory 3.

Figure 3A:
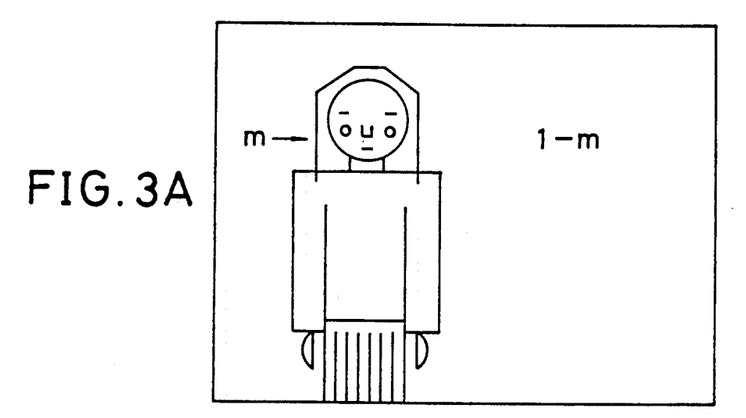
FIGS. 3A and 3B respectively are diagrams for explaining an image transmission.
Figure 3B:
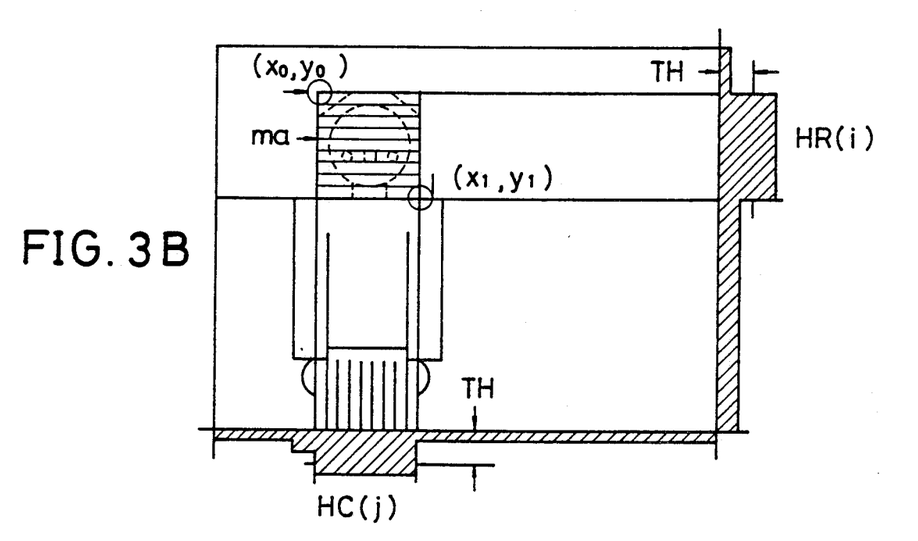
Figure 4:
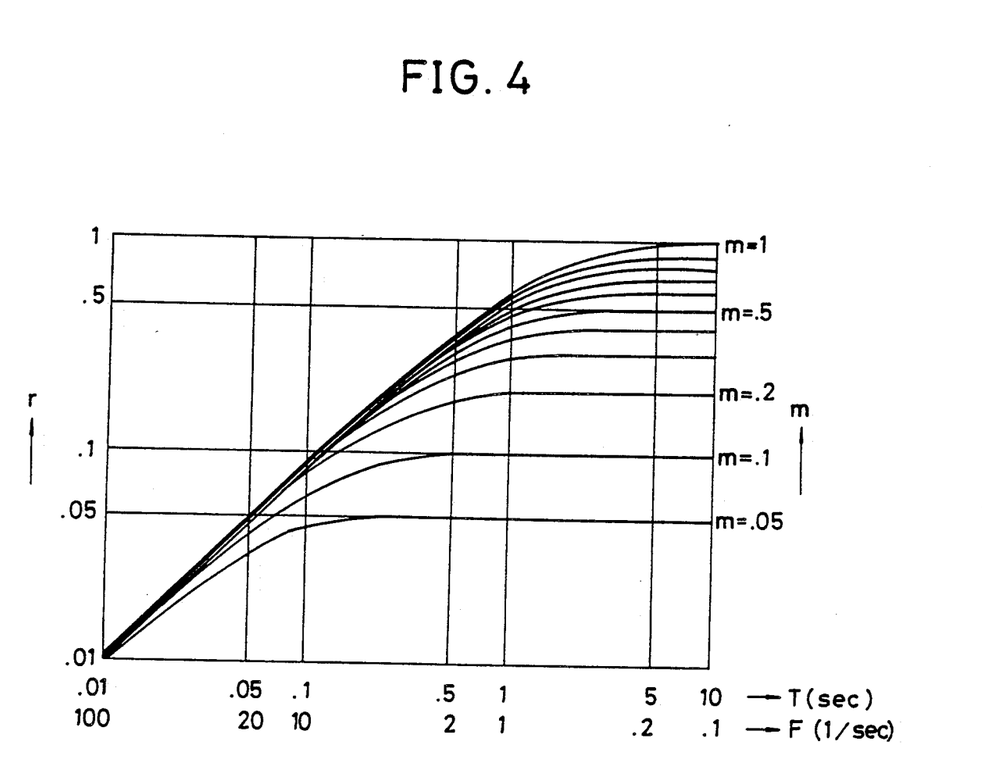
FIG. 4 shows a relationship between a frame frequency and a dynamic region rate.

FIGS. 3A and 3B respectively are diagrams for explaining an image transmission. FIG. 3A shows an image which is transmitted first and FIG. 3B shows an image which is transmitted thereafter. In FIG. 3A, m denotes a maximum dynamic region (area) rate which is normally in the order of 0.2 when it is assumed that a number of picture elements constituting the entire image is one. Hence, a minimum background region (area) rate $1-m$ is in the order of 0.8. According to experiments, an actual dynamic region rate r is described by $r = m \cdot (1 - \exp(-T/m))$, where $T (= 1/F)$ denotes a frame interval when F denotes a frame frequency. FIG. 4 shows a relationship between the frame frequency F and the dynamic region rate r.

Histograms are shown on the left and bottom of the image in FIG. 3B. These histograms have as the parameter a number of changing picture element data which is determined by comparing each of the corresponding picture element data of the image data transmitted for every frame. As may be seen from the histograms, the person in the image which is transmitted by the video phone is the main dynamic object. Particularly the face portion changes with short intervals, and the eyes and mouth undergo the most change. The present invention takes note of this characteristic and achieves a high image (data) compression efficiency by transmitting only the image data within the dynamic region. The dynamic region is positively identified at a high speed by using row and column histograms of the differences between the frames. The dynamic region rate depends on the frame frequency but is in the range of 0.02 to 0.2. By using a known ¼ interlace and a one-dimensional data compression, a high compression efficiency of 1/100 to 1/1000 ((0.03 to 0.2)×0.25×0.2 = (0.0014 to 0.01)) is obtainable. For example, the one-dimensional data compression includes a difference pulse code modulation (DPCM), an adaptive difference pulse code modulation (ADPCM), an adaptive discrete cosine transform (ADCT) and the like which are known.

Next, a description will be given of the operation of the embodiment of the dynamic image transmission system. The camera 7 picks up an object and outputs a video signal which is supplied to the A/D converter 9 via the camera interface 8. The A/D converter 9 converts the video signal into a digital image data at a rate of 30 frames per second and a sampling rate of 256×256 picture element data per frame. The digital image data is stored in the pickup memory 3a. The output of the camera interface is also supplied to the television interface 11. Hence, it is possible to selectively display and monitor on the display 12 the received image data which is stored in the reception memory 3c or the transmitting image data.

When an image transmission instruction is entered from the keyboard 5 and supplied to the CPU 1, a first frame of the image data which is picked up by the camera 7, that is, the image shown in FIG. 3A, is compressed in the data processor 4 under the control of the CPU 1. The data processor 4 compresses the first frame of image data for every line and adds a line identification code. The compressed image data from the data processor 4 is converted into a voice grade signal in the modem 2. The voice grade signal is output to the telephone line L via the NCU 6 in the sequence of the line numbers in an non-interlace. At the same time, an image data identical to the transmitting image data is stored in the transmission memory 3b.

The NCU 6 normally connects the telephone line L to the telephone set T. However, during the image data transmission, the NCU 6 disconnects the telephone line L from the telephone set T and connects the telephone line L to a data transmission circuit (not shown) within the NCU 6. In addition, prior to the data compression, the data of two mutually adjacent lines are compared. When the difference between the data of the two mutually adjacent lines is small and an absolute value accumulation of the differences of the corresponding picture element data does not reach a predetermined level, the two mutually adjacent lines are considered identical. In this case, only a no-change code is transmitted together with the line identification code.

After the image data of the first frame is transmitted as a still image, the image data of the next frame is entered. The image data of the next frame is successively received in sequence from the picture element data of the top left picture element of the image. Hence, each picture element data received is compared with the picture element data of the previous frame stored at a corresponding address of the transmission memory 3b while rewriting the content of the pickup memory 3a. An absolute value of the difference between the two compared picture element data of two successive frames is accumulated in corresponding row histogram memory HR(i) and column histogram memory HC(j) within the data processor 4. The picture element data of this next frame is written into the transmission memory 3b.

When the rewriting of the contents of the pickup memory 3a and the transmission memory 3b ends, a row histogram is stored in the row histogram memory HR(i) and a column histogram is stored in the column histogram memory HC(j). Hence, a search is made for a portion of the row and column histograms where the value is greater than a threshold value TH. When the image to be transmitted includes only one person as shown in FIGS. 3A and 3B, portions of the row and column histograms where the value is greater than the threshold value TH are continuous in most cases, and it is thus possible to easily extract a dynamic region ma $(x_0, y_0 - x_1, y_1)$. The dynamic region refers to a region in which the image includes a movement and is dynamic. The address of the extracted dynamic region ma is transmitted to the telephone line L via the modem 2 and the NCU 6, and the picture element data within the dynamic region ma is transmitted thereafter. The picture element data within the dynamic region ma is transmitted by using both the interlace and the one or two dimensional data compression. In this case, it is possible to identify the dynamic region at a high speed when the comparison of the corresponding picture element data is carried out only once for every predetermined number of picture elements greater than one.

On the receiver side, the image data which is received via the NCU 6 is demodulated in the modem 2 and the data processor 4 restores the original image data by carrying out a data expansion based on the line identification code. The restored image data is used to renew the image data within the reception memory 3c at only the address of the designated dynamic region.

In this embodiment, the dynamic region is designated by the addresses of the top left picture element and the bottom right picture element within the dynamic region. However, it is of course possible to designate the dynamic region by the address of the top left picture element within the dynamic region, a main scanning width within the dynamic region taken along a main scanning direction and a sub scanning width within the dynamic region taken along a sub scanning direction.

Figure 5:
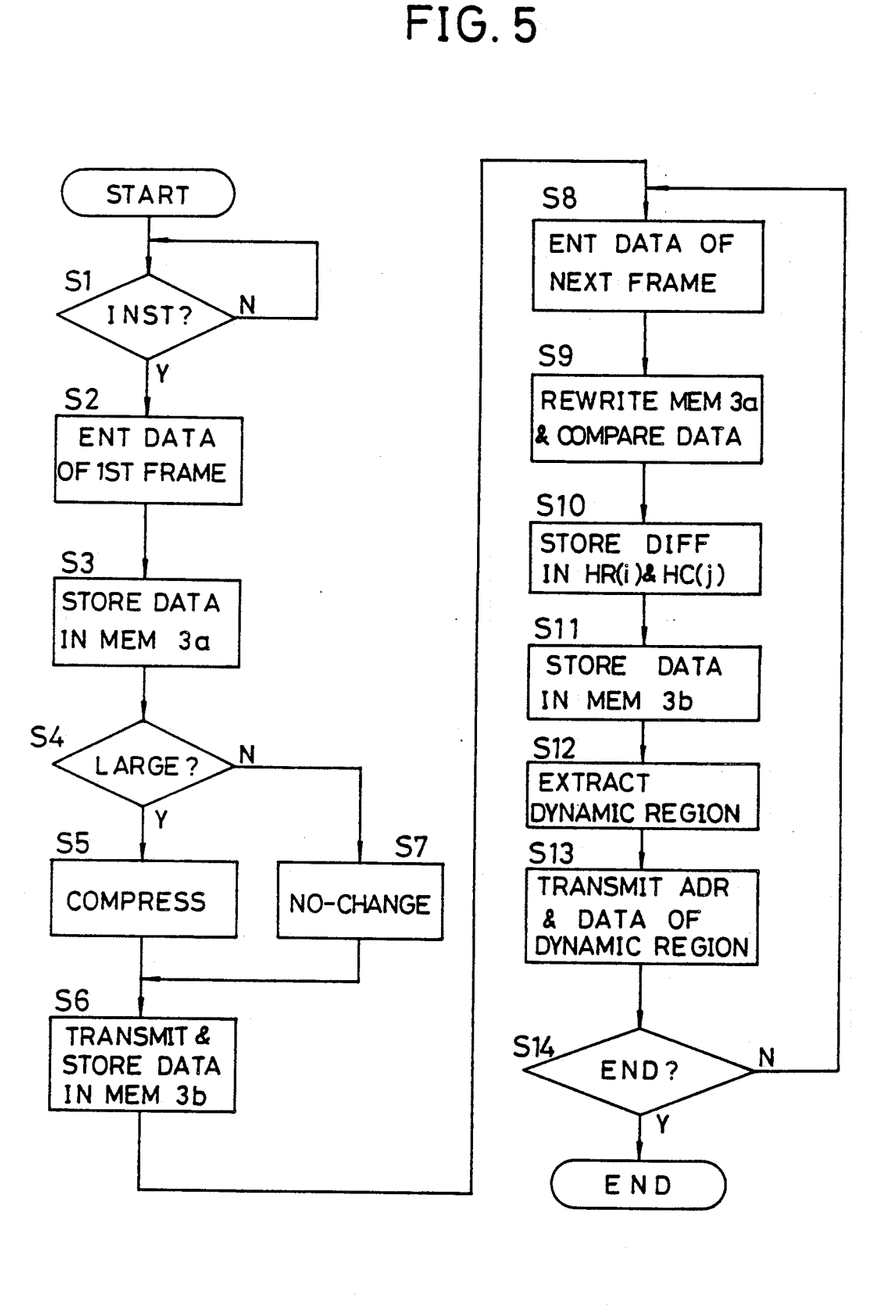
FIG. 5 is a flow chart for explaining an operation of a CPU shown in FIG. 1 during an image transmission mode.

FIG. 5 shows a process of the CPU 1 shown in FIG.1 during an image transmission mode. In FIG. 5, a step S1 discriminates whether or not an image transmission instruction is received from the keyboard 5. When the discrimination result in the step S1 becomes YES, a step S2 enters the image data of the first frame and a step S3 stores the entered image data into the pickup memory 3a. A step S4 discriminates whether or not a difference between the data of two mutually adjacent lines is larger than the predetermined level, with respect to each of the lines of the entered image. A step S5 compresses in the data processor 4 the data of the lines which are considered different as a result of the discrimination in the step S4. In this case, a step S6 converts the compressed image data into the voice grade signal in the modem 2 and transmits the voice grade signal to the telephone line L via the NCU together with the line identification code. The step S6 also stores the transmitting image data in the transmission memory 3b. On the other hand, when the discrimination result in the step S4 is NO, a step S7 generates a no-change code which is indicative of the discrimination result in the step S4 that the data of the two compared lines are considered identical. In this case, the step S6 transmits to the telephone line L only the no-change code together with the line identification code.

After the step S6, a step S8 enters the image data of a next frame. A step S9 rewrites the image data in the pickup memory 3a, and at the same time, compares the corresponding picture element data of the received image data and the image data stored in the transmission memory 3b. A step S10 accumulates the absolute value of the difference between two compared picture element data of the two successive frames in the row and column histogram memories HR(i) and HC(j) of the data processor 4, with respect to all of the picture element data of the received image data. Then, a step S11 stores the received image data, that is, the picture element data of this next frame, into the transmission memory 3b. A step S12 extracts a dynamic region of the received image by searching the portion of the row and column histograms where the value is greater than the threshold value TH. A step S13 transmits the address of the extracted dynamic region and the picture element data within the extracted dynamic region to the telephone line L via the modem 2 and the NCU 6. In this embodiment, the picture element data (image data) within the dynamic region is transmitted by using both the interlace and the one or two dimensional data compression. A step S14 discriminates whether or not the image transmission is ended. When there is one or more frames to be transmitted, the discrimination result in the step S14 is NO and the process returns to the step S8. On the other hand, the process is ended when the discrimination result in the step S14 is YES.

Figure 6:
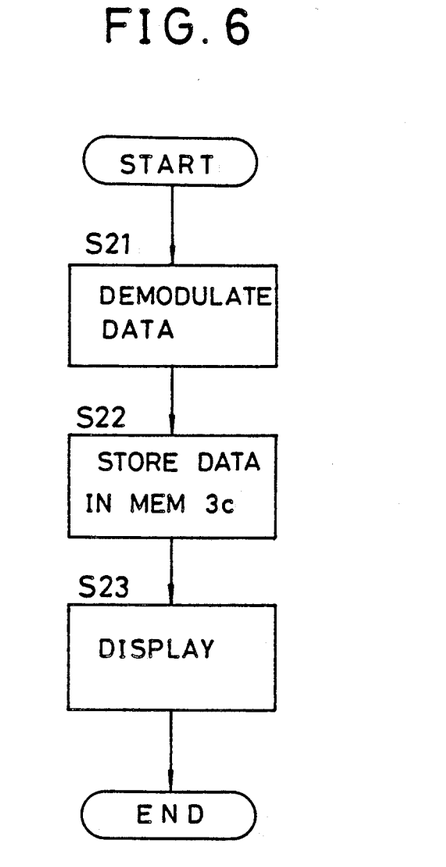
FIG. 6 is a flow chart for explaining an operation of the CPU shown in FIG. 1 during an image reception mode.

FIG. 6 shows a process of the CPU 1 shown in FIG.1 during an image reception mode. In FIG. 6, a step S21 demodulates in the modem 2 the image data which is received via the telephone line L and the NCU 6, and restores the demodulated image data back into the original image data in conformance with the transmission mode in the data processor 4. Since the image data is compressed at the time of the image transmission in this embodiment, the restoration of the demodulated image data includes a data expansion based on the line identification code. A step S22 stores the restored image data into the reception memory 3c. When storing the restored image data in the reception memory 3c, the restored image data (picture element data) is used to renew the image data already stored within the reception memory 3c at only the address of the designated dynamic region. A step S23 supplies the image data stored in the reception memory 3c to the display 12 via the D/A converter 10 and the television interface 11. As a result, the image of the received image data is displayed on the display 12 and the process is ended.

Further, the present invention is not limited to these embodiments, but various variations and modifications may be made without departing from the scope of the present invention.

What is claimed is

1. A dynamic image transmission system comprising:
   input means for inputting image data of an input image;
   memory means for storing the image data successively input from said input means and for storing transmitting image data which is to be transmitted;
   extracting means for extracting a dynamic region which is a portion of the input image and contains a change in image data from that of a previous frame by comparing image data of two successive frames stored in said memory means;
   transmission means for transmitting the image data stored in said memory means to a transmission path as the transmitting image data; and
   control means for controlling operations of said extracting means and said transmission means during an image transmission mode so that image data related to a first frame of the input image is transmitted as the transmitting image data but only the image data within the extracted dynamic region is transmitted as the transmitting image data with respect to second and subsequent frames;
   said transmitting means including means for subjecting only the image data within the extracted dynamic region using both a predetermined interlace and a predetermined data compression before transmission to the transmission path.

2. The dynamic image transmission system as claimed in claim 1 wherein said transmission means includes compression means for subjecting the transmitting image data to a predetermined data compression before transmission to the transmission path.

3. The dynamic image transmission system as claimed in claim 1 wherein said input means includes a camera for picking up the input image and for outputting the image data thereof.

4. The dynamic image transmission system as claimed in claim 1 wherein said transmission means includes a modem for modulating the transmitting image data.

5. The dynamic image transmission system as claimed in claim 1 which further comprises display means for displaying an image of the transmitting image data.

6. The dynamic image transmission system as claimed in claim 1 which further comprises a keyboard coupled to said control means for instructing the image transmission mode.

7. The dynamic image transmission system as claimed in claim 1 wherein said predetermined data compression is selected from a group including a difference pulse code modulation, an adaptive difference pulse code modulation and an adaptive discrete cosine transform.

8. The dynamic image transmission system is claimed in claim 1 wherein said predetermined data compression is selected from a group including one-dimensional data compression and two-dimensional data compression.

9. The dynamic image transmission system as claimed in claim 1 wherein the transmission path is a telephone line.

10. The dynamic image transmission system as claimed in claim 16 wherein said transmission means includes a network control unit which is connected to the telephone line.

11. The dynamic image transmission system as claimed in claim 1 which further comprises reception means for receiving transmitting image data which is transmitted from a said transmitting means of another dynamic image transmission system and received via the transmission path, said control means controlling operations of said reception means during an image reception mode so that the received transmitting image data is stored in said memory means with respect to the first frame and only the picture element data within the dynamic region is rewritten in said memory means with respect to the second and subsequent frames.

12. The dynamic image transmission system as claimed in claim 11 wherein said reception means includes expansion means for subjecting the received transmitting image data to a predetermined data expansion before storage in said memory means.

13. The dynamic image transmission system as claimed in claim 11 wherein said reception means includes a modem for demodulating the received transmitting image data.

14. The dynamic image transmission system as claimed in claim 11 which further comprises display means for displaying an image of the received transmitting image data.

15. A dynamic image transmission system comprising:
input means for inputting image data of an input image;
memory means for storing the image data successively input from said input means and for storing transmitting image data which is to be transmitted;
extracting means for extracting a dynamic region which is a portion of the input image and contains a change in image data from that of a previous frame by comparing image data of two successive frames stored in said memory means;
transmission means for transmitting the image data stored in said memory means to a transmission path as the transmitting image data; and
control means for controlling operations of said extracting means and said transmission means during an image transmission mode so that image data related to a first frame of the input image is transmitted as the transmitting image data but only the image data within the extracted dynamic region is transmitted as the transmitting image data with respect to second and subsequent frames;
said extracting means including comparing means for successively comparing corresponding picture element data making up the image data of the two successive frames stored in said memory means, accumulating means for accumulating in said memory means, accumulating means for accumulating a difference between two corresponding picture element data for all of the picture element data, and defining means for defining the dynamic region in which an absolute value of the difference is greater than a threshold value.

16. The dynamic image transmission system as claimed in claim 15 wherein said accumulating means accumulates the difference in a form of a row histogram taken along a direction of rows of picture elements constituting the input image and a column histogram taken along a direction of columns of picture elements constituting the input image.

17. The dynamic image transmission system as claimed in claim ,2 wherein said defining means defines the dynamic region by addresses of top left and bottom right picture elements within the dynamic region.

18. The dynamic image transmission system as claimed in claim ,2 wherein said defining means defines the dynamic region by an address of a top left picture element within the dynamic region, a main scanning width taken along a main scanning direction and a sub scanning width within the dynamic region taken along a sub scanning direction.

19. A dynamic image transmission system comprising:
input means for inputting image data of an input image;
memory means for storing the image data successively input from said input means and for storing transmitting image data which is to be transmitted;
extracting means for extracting a dynamic region which is a portion of the input image and contains a change in image data from that of a previous frame by comparing image data of two successive frames stored in said memory means;
transmission means for transmitting the image data stored in said memory means to a transmission path as the transmitting image data;
control means for controlling operations of said extracting means and said transmission means during an image transmission mode so that image data related to a first frame of the input image is transmitted as the transmitting image data but only the image data within the extracted dynamic region is transmitted as the transmitting image data with respect to second and subsequent frames; and
data processing means including first means for comparing picture element data of two mutually adjacent lines with respect to all lines in the first frame, second means for accumulating a difference between the picture element data of the two mutually adjacent lines, third means for generating a line identification code indicative of a position of each line within the frame, and fourth means for generating a no-change code when an absolute value of the difference is less than a predetermined threshold level.

20. The dynamic image transmission system as claimed in claim 7 wherein said transmission means includes compression means for subjecting the transmitting image data to a predetermined data compression before transmission, said transmission means transmitting only the no-change code together with the line identification code when said no-change code is generated by said fourth means.

* * * * *